June 5, 1923. 1,457,874
W. A. BROWN
COUNTERBALANCING AND OSCILLATING DEVICE FOR ELECTRIC HEATERS AND LAMPS
Filed Sept. 14, 1922 2 Sheets-Sheet 2

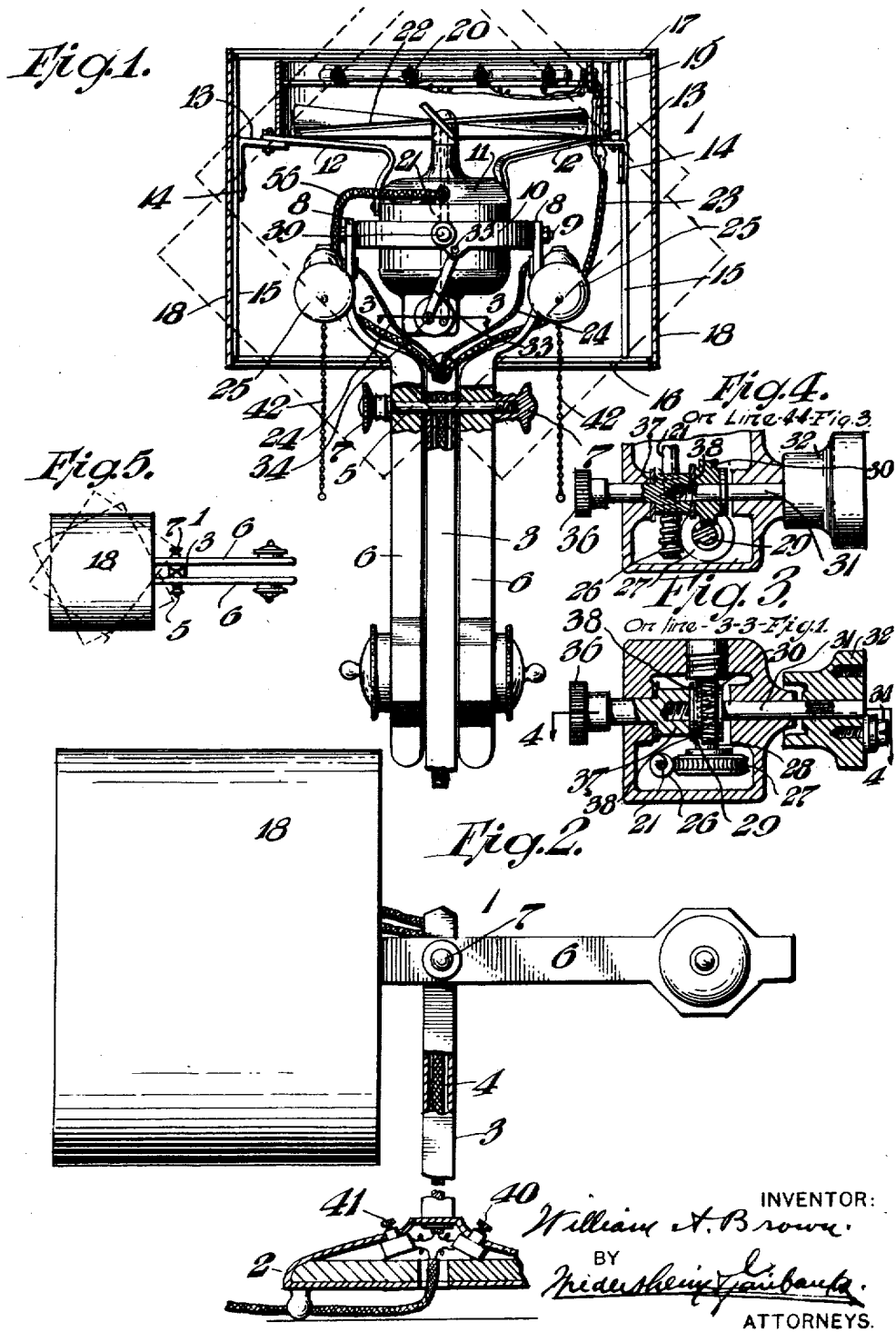

INVENTOR:
William A. Brown,
BY
ATTORNEYS.

Patented June 5, 1923.

1,457,874

UNITED STATES PATENT OFFICE.

WILLIAM A. BROWN, OF PHILADELPHIA, PENNSYLVANIA.

COUNTERBALANCING AND OSCILLATING DEVICE FOR ELECTRIC HEATERS AND LAMPS.

Application filed September 14, 1922. Serial No. 588,107.

*To all whom it may concern:*

Be it known that I, WILLIAM A. BROWN, a citizen of the United States, residing in the city and county of Philadelphia, State of Pennsylvania, have invented a new and useful Counterbalancing and Oscillating Device for Electric Heaters and Lamps, of which the following is a specification.

My invention consists of a novel construction of a counterbalancing and oscillating device for an electric, table, wall or floor combined heater, blower and lamp, whereby I provide novel means for enabling the electric lighting, blowing and heating devices to be positioned at any angle with respect to their support, the counterbalancing devices further having the function of entirely eliminating the vibration of the fan motor which diffuses the heat from the heater and the oscillating device serving, when desired, continually and automatically to change the position of the lamp and heating and blowing mechanism, so that the heat is diffused in all directions in the room or compartment to be heated, provision being made for enabling the shade of the lamp effectively to conceal the operative parts of the device, in addition to performing its usual function of a reflector, whereby a novel and effective appliance is produced having a pleasing as well as a utilitarian appearance.

To the above ends, my invention consists of a novel construction of standard, support or side bracket which may be employed, upon which is pivotally supported the novel lighting, blowing and heating mechanism and their adjuncts by a suitable arm or arms, which are provided with counterbalancing devices, means being provided for locking the counterbalancing arm or arms, lighting, blowing and heating devices in any desired position, whereby vibration of the motor which diffuses the heat is entirely eliminated.

It further consists of a novel construction of a support carrying the electric lighting, heating and blowing devices, suitable provision being made whereby said devices may be caused if desired automatically to oscillate, so as to diffuse the heat into every portion of the room or compartment to be heated, provision being further made for controlling the operation of said devices, so that they may be operated singly or in unison.

It further consists of other novel features of construction, all as will be hereinafter fully set forth.

For the purpose of illustrating my invention, I have shown in the accompanying drawings, forms thereof which are at present preferred by me, since the same will give in practice satisfactory and reliable results, although it is to be understood that the various instrumentalities of which my invention consists may be variously arranged and organized and that my invention is not limited to the precise arrangement and organization of these instrumentalities as herein shown and described.

Figure 1 represents a vertical sectional view of a counterbalancing and oscillating device for an electric heater and lamp embodying my invention.

Figure 2 represents a side elevation of Figure 1, showing the heating, blowing and lighting mechanisms concealed by the lamp shade and the supporting arm or counterbalancing device therefor positioned horizontally, the base being shown in section.

Figure 3 represents on an enlarged scale a section on line 3—3 Figure 1, showing a portion of the oscillating mechanism whereby the motor blower and heating devices are automatically oscillated to and fro when desired.

Figure 4 represents a section on line 4—4 Fig. 3.

Figure 5 represents on a reduced scale, a plan view of the device showing in dotted lines, the different positions the lamp shade and the blowing, lighting and heating elements concealed within it may assume.

Similar numerals of reference indicate corresponding parts.

Referring to the drawings:—

Figure 6:
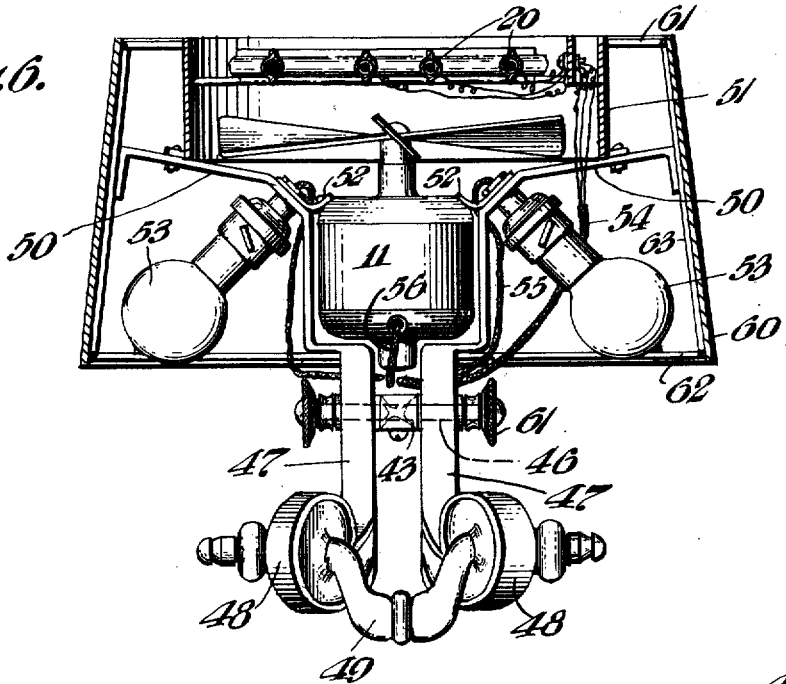
Figure 6 represents a vertical sectional view of another embodiment of my invention, showing the same applied to a wall bracket.
Figure 7:
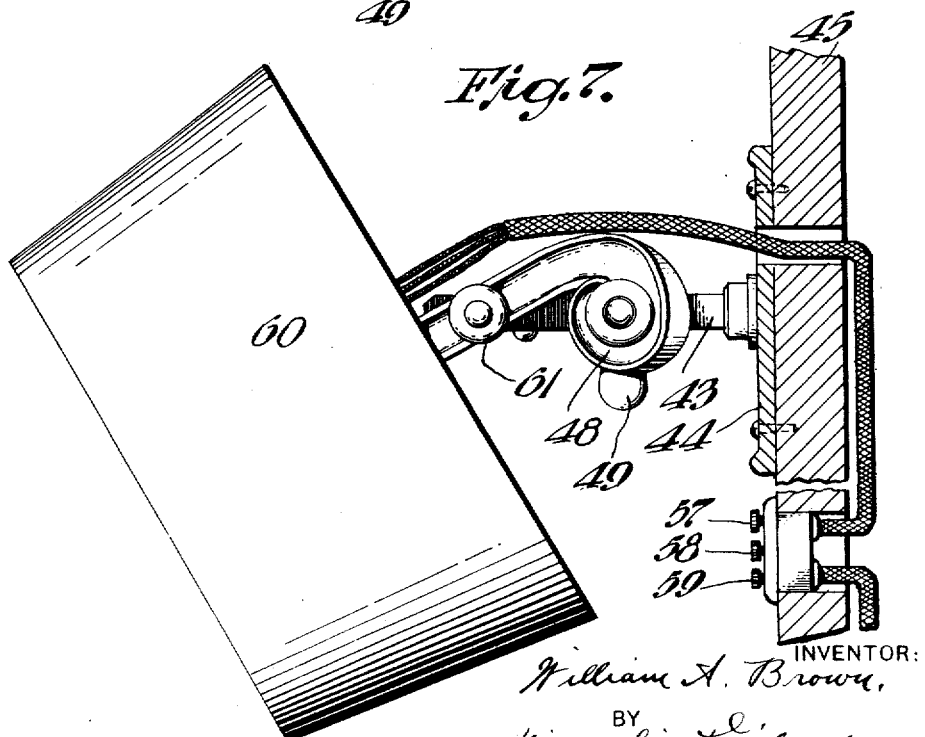
Figure 7 represents a side elevation of Figure 6, showing the heating and blowing devices inclined downwardly at an angle from the horizontal.

In carrying out my invention, which it will be understood is adapted for a floor lamp, a table lamp or a wall lamp, I have shown my invention in Figs. 1 to 5 as adapted to a floor or table lamp, and in Figures 6 and 7, I have shown my invention as adapted to a wall bracket, or, in other words, adapted to be supported from the vertical side wall of a room or compartment.

Referring first to Figures 1 to 5, 1 designates my novel construction of lamp, the same being shown as provided with a suitable foot or base 2, on which is supported a standard 3, which may be hollow and serve as a container for the electrical connection 4.

5 designates a threaded rod or pivotal connection, which passes through the upper end of the standard 3 and also through the arm or arms 6, two of said arms being preferably employed, which are located on each side of the standard 3 and the rod or pivotal connection 5 being threaded at one or both ends and being provided with the nut or its equivalent 7, whereby the pivotal connection can be tightened or loosened, according to requirements. If both ends of the rod are threaded, it will be evident that two nuts 7 will be employed, or, if desired, one of said nuts may be integral with said rod and only a single nut employed.

The ends 8 of the arms 6 are attached by suitable means 9 to the ring 10, which surrounds the motor casing 11, which has the trunnions 39 rotatable in said ring, so that the blower, heater and their adjuncts can be oscillated in the desired directions.

From the upper portion of the motor casing 11 project the laterally deflected arms 12, which are secured at their outer ends to the members 13 of angle-shaped brackets, whose lower pendant members 14 are secured to the upright rods 15, which are secured at their bottom ends to the bottom ring 16, the upper ends of said rods 15 being secured to the upper ring 17, said uprights 15, lower rings 16 and upper rings 17 constituting a skeleton frame or support for the lamp shade 18.

19 designates an open-ended support, ring or casing, which is bolted or supported at its lower portion upon the laterally extending members 13 and in the upper portion of the casing or frame 19, which is open-ended and of any desired contour, I locate the electric heater 20, which may be of any suitable construction and composed of a series of heating coils or resistance coils of any desired construction.

21 designates a motor shaft, which has secured to its upper end the fan or blower 22, the latter being positioned between the motor casing 11 and the electric heater 20.

23 designates the conductors leading to the heater 20, and 24 designates the conductors which lead to the electric lights 25, any desired number of which, as two, three or four, or more, may be employed. The electric lights 25 are supported in suitable sockets, which may be attached to the arms 8 in any suitable manner.

It will be obvious that my invention may be employed in connection with a fan or blower which is stationary, that is, incapable of oscillatory movement, as seen in Figure 6, if desired, or I may provide means for enabling the blowing and heating mechanism automatically to be oscillated to and fro, so that the heat will be diffused into every portion of the room or apartment, and in carrying out this feature of my invention, I employ the construction shown in Figures 1, 3 and 4, from which latter figures it will be apparent that the motor shaft 21 is provided with a worm 26, which is in mesh with the gear 27, which is mounted on the shaft 28. The shaft 28 is provided with a worm 29, whereby motion is imparted to the gear 30, which is mounted upon the shaft 31, which carries the disk or head 32, which has one end of the link 33 eccentrically connected thereto at 34, the upper or opposite end of said link being connected at the fixed point 35 to the ring or frame 10.

By the turning or manual adjustment of the finger piece or head 36, the portion 37 is caused to frictionally engage the surface 38, whereupon the rotation of the worm 26 and the gear 27 is communicated to the shaft 31 and head or disk 32, so that oscillatory movement may be imparted to the link 33 whenever desired, whereupon the blower casing 11 oscillates on the diametrically disposed trunnions 39.

It will thus be seen from the foregoing that I have provided two particularly novel features in connection with my invention, the first relating to the counterbalancing of the principal operative parts by means of the elongated weighted arms 6, whereby the blowing and heating elements together with the shade 18 may be positioned at any desired angle to the horizontal or vertical plane upon loosening the nut 7, the other feature of my invention relating to the oscillating movement which is imparted to the heating and blowing mechanism and their adjuncts, the electric heating device, blower, and shade moving as a unit, and the construction being such that the blower, electric heater and the shade all are caused to function in unison and, in addition, automatically to oscillate when desired, whereby the heat is diffused into every portion of the room or compartment to be heated.

It will be further apparent that the elongated arms 6 which are made of considerable length and weight to suit requirements, the weight of said arms to one side of the pivotal connection 5 being designed so as effectively to balance the weight of all the other elements on the other side of the pivot, have a dual function since they not only effect the counterbalancing of the device according to requirements, but, in addition, by reason of their weight, they take up and in practice totally eliminate all the vibration of the motor 11, so that no matter at what speed the motor or blowing apparatus is operated, no vibration is present.

I make no claim to the oscillating mechanism, per se, seen in Figs. 3 and 4, and I have deemed it unnecessary to describe the same in greater detail, as the oscillating mechanism per se is employed in electric fans, but I am the first in the art to employ in conjunction with an oscillating blowing mechanism of the character above described, electric heating and lighting mechanism independently controlled and positioned and functioning as above explained, and I am also the first in the art to employ in connection with the oscillating blowing mechanism a shade support and electric heater support collocated and positioned as above described, and my claims to these features are to be interpreted with the scope according to inventions of this character.

It will thus be seen from the foregoing that by loosening the nut 7, the position of the electric heating and blowing devices can be readily adjusted and they can be locked at any desired angle to the vertical or the horizontal, there will be no vibration at any speed of the blower or under any conditions and the heat can be diffused or converged upon a single point, or, if desired, upon causing the automatic operation of the blower by the manipulation of the head or button 36, the heat can be diffused to all points of the room or the compartment to be heated.

In the construction seen in the lower portion of Figure 2, I have shown switches 40 and 41, which may be of any conventional type, one of which may control the electric heating appliances, and the other may control the operation of the fan or blower, so that if desired, the operation of the fan or the heater can be controlled or dispensed with entirely or used as may be desired, or the fan can be used alone without the electric heating devices, or the fan and the electric heating devices can be used conjointly. The electric lights are controlled by pendant chains 42 of the usual construction, so that the lights can be on or off as may be desired, during the operation of the blower and heater.

In the construction seen in Figures 6 and 7, I have shown my invention as applied to a wall bracket 43, which is attached to a vertical plate 44, which is attached to or supported from the wall 45 in any suitable manner.

The bracket or horizontal arm 43 has the pivotal connection or rod 46 passing therethrough and also through the arms 47, which are provided at their inner ends with the weighted or counterbalancing devices 48, which may be of ornamental design and are joined by the transverse connection 49, the outer ends of the arms 47 being laterally and upwardly deflected as indicated at 50 and carrying the open-ended casing, guard or frame 51 of any desired contour, and being secured to the electric motor casing 11 by the connections 52.

The arms 50 also support the sockets for the electric lights 53 and within the casing 51 is located the electric heater 20 of the same construction as already described.

54 designates the electrical connections to the heater 20. 55 designates the electric connections to the lamps 53, and 56 designates the electrical connections to the motor 11, which are the same as indicated at 56 in Fig. 1, said connections being controlled by the switches 57, 58 and 59 seen at the lower portion of Figure 7, whereby either the lights, blower or heater can be operated independently or in unison.

The lamp shade 60 is shown in Figures 6 and 7 as being of conical shape, although it is evident that the same may be cylindrical if desired, as seen in Figures 1, 2 and 5, said lamp shade being supported upon a frame composed of the upper ring 61, the lower ring 62 and the connecting inwardly converging rods 63, the lamp shade support consisting of the above-named elements being suitably supported from the arms 50, as will be understood from Figure 6.

It will be apparent from the construction seen in Figures 6 and 7, that the wall lamp seen therein can be positioned at any desired angle to the horizontal upon loosening the nut 61 on the pivotal connection 46, and by reason of the counterbalancing of the parts, the heating, blowing and lighting devices and their adjuncts can be oscillated as a unit, and no matter at what speed the blower is operated, there will be no vibration.

It will be apparent that the oscillating fan arrangement seen in Figures 1, 3 and 4 can be employed in the construction seen in Figure 6, if desired.

In all the embodiments of my invention, there is a common support for the heater, blower, lights and lamp shade, and a very compact, rigid, durable and efficient structure is produced, as is evident, which can be utilized as a heater or a blower or as an electric lamp, and all the above elements can be caused to function singly or conjointly.

It will now be apparent that I have devised a novel and useful counterbalancing and oscillating device for an electric heater and lamp, which embodies the features of advantage enumerated as desirable in the statement of the invention and the above description and while I have in the present instance shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, an electric heater, an electric blower supported in proximity to said heater to diffuse the heated air, means for causing said electric heater and blower to oscillate to and fro as a unit, in combination with an elongated arm pivotally supported, said arm carrying at one end said heater and blower, and counterbalancing devices on the other end of said arm, whereby vibration of said blower is eliminated, and the weight thereof and its adjuncts is balanced.

2. In a device of the character stated, an electric blower and an electric heater supported in proximity thereto, an open ended guard for said blower, said guard supporting said heater, means for oscillating said blower, electric heater and guard as a unit, in combination with an elongated arm pivotally supported, said arm carrying at one end said heater and blower, and counterbalancing devices on the other end of said arm, whereby vibration of said blower is eliminated, and the weight thereof and its adjuncts is balanced.

3. In a device of the character stated, an outer skeleton frame serving as a lamp shade support, an electric blower and an electric heater located within said frame, said parts being movable as a unit, means for oscillating said blower, electric heater and outer skeleton frame as a unit, in combination with an elongated arm pivotally supported, said arm carrying at one end said heater and blower, and counterbalancing devices on the other end of said arm, whereby vibration of said blower is eliminated, and the weight thereof and its adjuncts is balanced.

4. In a device of the character stated, a support, an arm carrying an electric blower and an electric heater and pivoted to said support, a weight on said arm at one side support to counterbalance the weight of said support to counterbalance the weight of the elements on the opposite side of said support whereby vibration of said blower is eliminated and said blower and heater are counterbalanced and means for locking said arm in adjusted position.

5. In a device of the character stated, a support, an elongated weighted arm pivotally mounted upon said support and forming a counterbalance, an electric blower carried by said arm, an electric heater supported in proximity to said blower, the ends of said arm being extended to one side of said pivotal support so that the weight on each side of said pivotal support is the same and balanced and means for locking said arm and the elements carried thereby in adjusted position with respect to said support.

6. In a device of the character stated, the combination of a blower, an open-ended guard supported upon said blower, an electric heater carried by said guard and located in proximity to said blower, a skeleton frame serving as a lamp shade support and supported by said blower, a pair of arms carrying said blower and heater, a support for said arms, and a pivotal projection common to said arms and support, said arms being extended to one side of said support and weighted to counterbalance the elements supported on the opposite side of said support.

7. In a device of the character stated, an electric heater, an electric blower supported in proximity to said heater to diffuse the heated air, means for causing said electric heater and blower to oscillate to and fro as a unit, an arm carrying said blower and heater, a support on which said arm is pivoted, a counterbalance on said arm at one side of said support to counterbalance the weight of the elements on the opposite side of said support and means for locking said arm in adjusted position.

8. In a device of the character stated, an electric heater, an electric blower supported in proximity to said heater to diffuse the heated air, an electric light supported in proximity to said blower, means for causing said electric heater and blower to oscillate to and fro as a unit, in combination with an elongated arm pivotally supported, said arm carrying at one end said heater and blower, and counterbalancing devices on the other end of said arm, whereby vibration of said blower is eliminated, and the weight thereof and its adjuncts is balanced.

9. In a device of the character stated, an electric blower and an electric heater supported in proximity thereto, an open ended guard for said blower, said guard supporting said heater, an electric light supported in proximity to said blower, means for oscillating said blower, electric heater and guard as a unit, in combination with an elongated arm pivotally supported, said arm carrying at one end said heater and blower, and counterbalancing devices on the other end of said arm, whereby vibration of said blower is eliminated, and the weight thereof and its adjuncts is balanced.

10. In a device of the character stated, an outer skeleton frame serving as a lamp shade support, an electric blower and electric heater located within said frame, said parts being movable as a unit, an electric light located within said frame, means for oscillating said blower, heater and frame as a unit, in combination with an elongated arm pivotally supported, said arm carrying at one end said heater and blower, and counterbalancing devices on the other end of said arm, whereby vibration of said blower is eliminated, and the weight thereof and its adjuncts is balanced.

WILLIAM A. BROWN.

Witnesses:
E. HAYWARD FAIRBANKS,
C. D. McVAY.